(12) United States Patent
Yamada (10) Patent No.: US 8,890,933 B2
(45) Date of Patent: Nov. 18, 2014

(54) PARALLAX IMAGE CONVERSION APPARATUS

(75) Inventor: Masahiro Yamada, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 577 days.

(21) Appl. No.: 13/171,419

(22) Filed: Jun. 28, 2011

(65) Prior Publication Data

US 2012/0133644 A1 May 31, 2012

(30) Foreign Application Priority Data

Nov. 26, 2010 (JP) ................................ 2010-263225

(51) Int. Cl.
*H04N 13/00* (2006.01)
*H04N 13/02* (2006.01)
*H04N 5/50* (2006.01)
*G06T 15/00* (2011.01)
*H04N 13/04* (2006.01)

(52) U.S. Cl.
CPC ......... *H04N 13/007* (2013.01); *H04N 13/0456* (2013.01); *H04N 13/004* (2013.01)
USPC ................ 348/43; 348/51; 348/569; 345/419

(58) Field of Classification Search
None
See application file for complete search history.

(56) References Cited

U.S. PATENT DOCUMENTS

| | | | |
|---|---|---|---|
| 2009/0142041 A1* | 6/2009 | Nagasawa et al. | 386/124 |
| 2010/0074594 A1* | 3/2010 | Nakamura et al. | 386/92 |
| 2011/0085024 A1* | 4/2011 | Ota | 348/43 |
| 2011/0149022 A1* | 6/2011 | Klebanov et al. | 348/42 |
| 2012/0044241 A1* | 2/2012 | Chen et al. | 345/419 |

FOREIGN PATENT DOCUMENTS

| | | |
|---|---|---|
| JP | 09-023450 | 1/1997 |
| JP | 11-289555 A1 | 10/1999 |
| JP | 2000-078611 | 3/2000 |
| JP | 2005-079704 | 3/2005 |
| JP | 2006195018 A | 7/2006 |
| JP | 2009135686 A | 6/2009 |
| WO | 2004090860 A1 | 10/2004 |
| WO | 2010058547 A1 | 5/2010 |

OTHER PUBLICATIONS

Japanese Office Action for Japanese Patent Application No. 2010-263225, dated Jan. 4, 2012.

* cited by examiner

*Primary Examiner* — Geepy Pe
*Assistant Examiner* — Rebecca Volentine
(74) *Attorney, Agent, or Firm* — Patterson & Sheridan, LLP (57) ABSTRACT

A parallax image conversion apparatus according to an embodiment includes: a first multiple parallax image generation unit configured to generate a first multiple parallax image concerning a first image signal; a second multiple parallax image generation unit configured to receive a second image signal, depth information, and blend information concerning an OSD image, change the blend information based on the depth information, and generate a second multiple parallax image concerning the OSD image based on the second image signal and the depth information; and a compounding unit configured to compound the first multiple parallax image and the second multiple parallax image by using the changed blend information.

12 Claims, 9 Drawing Sheets

PARALLAX IMAGE CONVERSION APPARATUS

CROSS-REFERENCE TO RELATED APPLICATION

This application is based upon and claims the benefit of priority from prior Japanese Patent Application No. 2010-263225 filed on Nov. 26, 2010 in Japan, the entire contents of which are incorporated herein by reference.

FIELD

Embodiments described herein relate generally to a parallax image conversion apparatus.

BACKGROUND

In recent years, a parallax image conversion apparatus which receives and decodes a transmitted and coded two-dimensional image signal, and then converts the decoded two-dimensional image signal to a multiple viewpoint image has been proposed.

Furthermore, it is conducted to superpose an OSD (On Screen Display), which is a setting screen for a menu or the like, on a two-dimensional image having no depth information.

However, it has not been studied sufficiently how the OSD should be displayed in a display apparatus which needs depth information when displaying an image by using a two-dimensional image signal, such as, for example, an autostereoscopic image display apparatus (a stereoscopic image display apparatus without glasses).

DETAILED DESCRIPTION

According to an embodiment, there is provided a parallax image conversion apparatus including: a first multiple parallax image generation unit configured to generate a first multiple parallax image concerning a first image signal; a second multiple parallax image generation unit configured to receive a second image signal, depth information, and blend information concerning an OSD image, change the blend information based on the depth information, and generate a second multiple parallax image concerning the OSD image based on the second image signal and the depth information; and a compounding unit configured to compound the first multiple parallax image and the second multiple parallax image by using the changed blend information.

Hereafter, a parallax image conversion apparatus according to embodiments will be described more specifically with reference to the drawings.

First Embodiment

Figure 1:
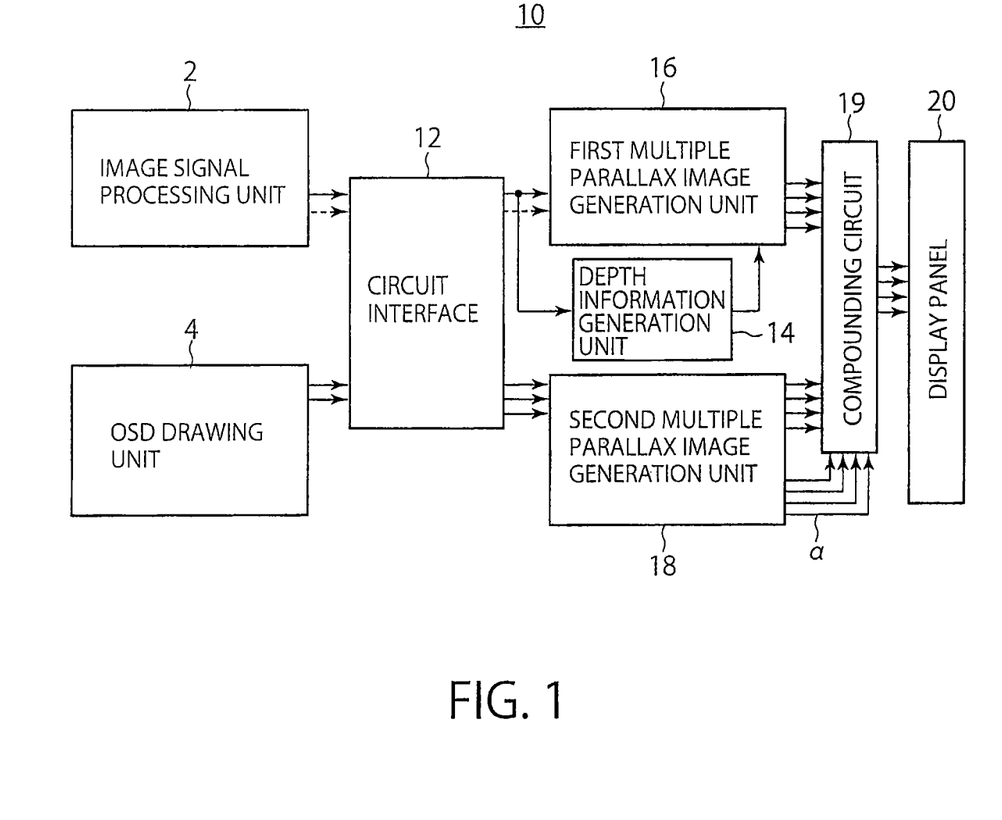
FIG. 1 is a block diagram showing a parallax image conversion apparatus according to an embodiment.

A parallax image conversion apparatus according to an embodiment is shown in FIG. 1. A parallax image conversion apparatus 10 according to the present embodiment includes a circuit interface 12, a depth information generation unit 14, a first multiple parallax image generation unit 16, a second multiple parallax image generation unit 18, and a compounding circuit 19.

The circuit interface 12 sends an image signal received by an image signal processing unit 2 to the first multiple parallax image generation unit 16, and sends an OSD (On Screen Display) such as, for example, a menu, generated by an OSD drawing unit 4 to the second multiple parallax image generation unit 18.

Figure 2:
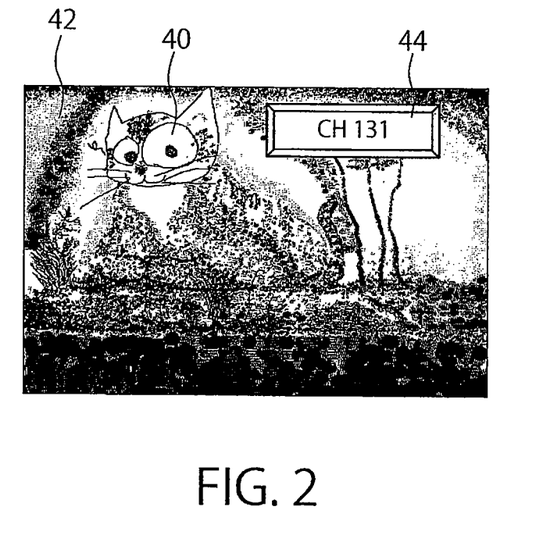
FIG. 2 shows an image displayed by superposing an image signal of an OSD on a two-dimensional image signal.

The image signal received by the image signal processing unit 2 is a coded two-dimensional image signal or a coded multiple parallax image signal which is input via a broadcast or a network. The image signal processing unit 2 decodes the coded two-dimensional image signal or the coded multiple parallax image signal, and generates the decoded two-dimensional image signal or the decoded multiple parallax image signal. If the OSD is simply superposed on the decoded two-dimensional image signal, for example, a resultant composite image is displayed on a display panel 20 as shown in FIG. 2. In FIG. 2, "CH 131" denoted by a reference numeral 44 represents the OSD. In FIG. 2, the OSD 44 indicates a channel number.

Figure 3:
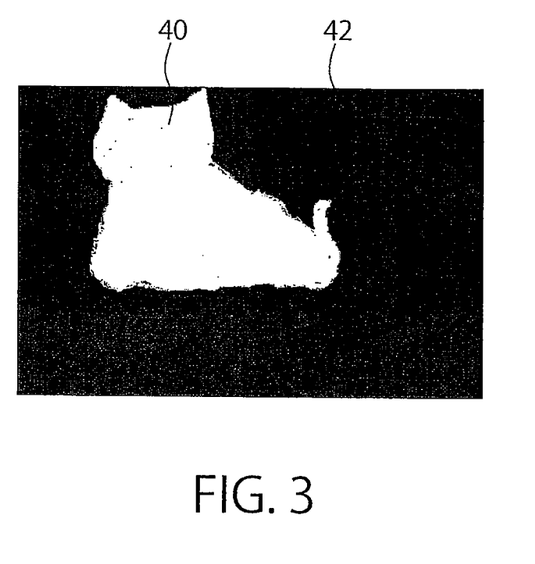
FIG. 3 is a diagram for explaining a case in which depth information is generated from the two-dimensional image shown in FIG. 2.

The depth information generation unit 14 analyzes the decoded two-dimensional image signal or the decoded multiple parallax image signal, and generates depth information of the image. For example, the depth information generation unit 14 generates depth information of an object (for example, a "cat") 40 from a two-dimensional image shown in FIG. 2. The generation of the depth information is conducted by using a well-known method. This method includes, for example, separating a signal to a signal of a background region 42 shown in FIG. 2 and a signal of an image 40 in a remaining region, calculating a representative motion vector of the background region 42 from a motion vector of the two-dimensional image and a motion vector of the background region 42, subtracting the representative motion vector from the motion vector of the two-dimensional image to calculate a relative motion vector, and generating depth information of the image 40 of the two-dimensional image signal as shown in FIG. 3 by using the relative motion vector. As for the depth information, an object indicated to be located this side (for example, the object 40 shown in FIG. 2) assumes a greater value than that of an object indicated to be located on the back (for example, the background 42 shown in FIG. 2).

The first multiple parallax image generation unit 16 generates a multiple parallax image by using the depth information generated by the depth information generation unit 14. For example, if the parallax image conversion apparatus according to the present embodiment is used in a glass type stereoscopic image display apparatus, the first multiple parallax image generation unit 16 generates a two-parallax image. If the parallax image conversion apparatus according to the present embodiment is used in an autostereoscopic image display apparatus, i.e. a stereoscopic image display apparatus without glasses, the first multiple parallax image generation unit 16 generates, for example, a multiple parallax image viewed from nine directions, i.e., a nine-parallax image inclusive of the center. An object indicated to be located at the front side (for example, the object 40 shown in FIG. 2) having great depth information is seen to be deviated to the right side as compared with an object located in the background 42. Therefore, the first multiple parallax image generation unit 16 generates a parallax image viewed from the left direction by conducting processing for deviating the image to the right side. Furthermore, as for a parallax image viewed from the right direction, the first multiple parallax image generation unit 16 generates a parallax image viewed from the right direction by performing processing for shifting the image to the left side. In this way, the first multiple parallax image generation unit 16 generates a two-parallax image, or a nine-parallax image viewed from nine positions from the left to the right in the horizontal direction. If processing for shifting the position of an object is performed when generating a parallax image in this way, originally its background image should be seen. Since the input image hasn't the information, however, processing of simply distorting the image is performed. If the image signal transmitted from an image signal processing unit 2 via the circuit interface 12 includes depth information, then the first multiple parallax image generation unit 16 generates a multiple parallax image by using an image signal (an image signal represented by a dashed line) without using the depth information generated by the depth information generation unit 14.

The OSD drawing unit 4 draws or sets an OSD which is a setting image such as, for example, a menu. The OSD includes a graphic image or the like besides the setting image such as a menu. And in the present embodiment, the OSD region is displayed so as to be projected in order to make the OSD region prominent when displayed on the display panel. Therefore, the OSD includes depth information. Furthermore, the OSD includes luminance values of R (red), G (green) and B (blue) in each pixel and blend information α besides the depth information. The blend information α is information (a value) used in the so-called α blend (alpha blend), and the blend information α indicates a degree with which the OSD image and the background are blended. If the blend information α is represented by n bits, it assumes an integer value in the range of $0 \leq \alpha \leq 2^n - 1$. Note that the depth information may be input to the OSD drawing unit 4 when drawing or setting the OSD, or the depth information may be generated by using software in the OSD drawing unit 4. Furthermore, the depth information included in the OSD may be configured to be modified or changed by a user's operation on a menu screen. Owing to such a configuration, the projection state of the OSD at the time when it is displayed can be made as the user desires.

The OSD which is drawn or set by the OSD drawing unit 4 is sent to the second multiple parallax image generation unit 18 via the circuit interface 12.

Figure 4:
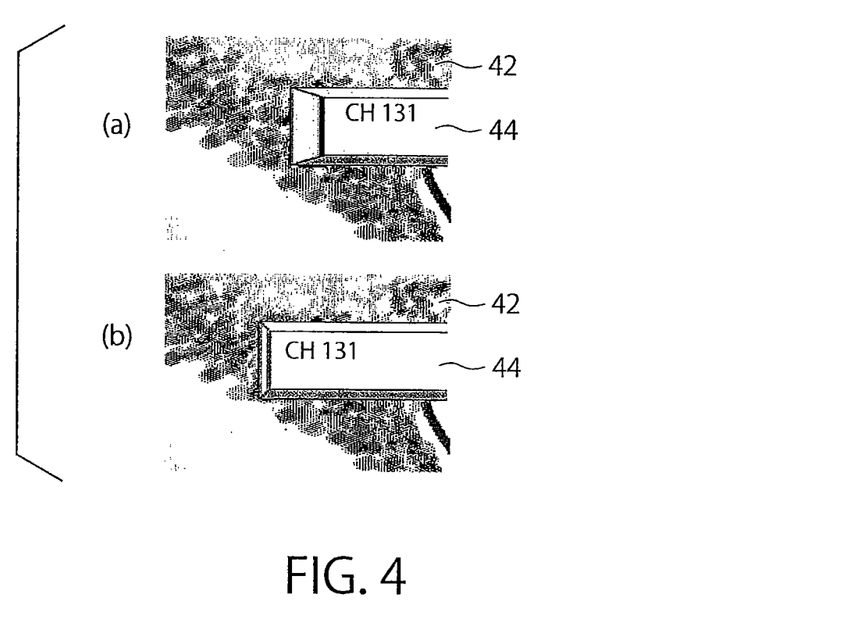
FIGS. 4(a) and 4(b) are diagrams showing a parallax image for a left eye and a parallax image for a right eye, respectively.

The second multiple parallax image generation unit 18 generates a multiple parallax image, which has the same number of parallaxes as that generated by the first multiple parallax image generation unit 16, by using the depth information included in an OSD on the basis of the OSD sent via the circuit interface 12. For example, if the OSD is "CH 131" which indicates the channel number in FIG. 2 and a parallax image generated by the first multiple parallax image generation unit 16 is a two-parallax image, then the second multiple parallax image generation unit 18 generates a parallax image for a left eye (FIG. 4(a)) and a parallax image for a right eye (FIG. 4(b)) as a two-parallax image by using a transforming filter from the original OSD image drawn or set in the OSD drawing unit 4. Note that FIGS. 4(a) and 4(b) show parallax images generated by taking out a partial image including the OSD image. As the parallax image for the left eye, a rectangular region showing an OSD image 44 is shifted to the right direction. As the parallax image for the right eye, the rectangular region showing the OSD image 44 is shifted to the left direction. Since the background is not shifted at this time, distortion is caused at a joint between the OSD image 44 and the background. An edge portion of the rectangular region becomes a blurred image which is hard to view. With regard to the depth information, however, there are, for example, depth information for the image 40 shown in FIG. 2 and depth information for the OSD 44, independently. As for generation of a parallax image performed by the second parallax image generation unit 18, however, the depth information for OSD is used for the OSD image 44 and consequently distortion is not generated in the background 42.

When compounding the multiple parallax image of the OSD generated by the second multiple parallax image generation unit 18 and the multiple parallax image generated by the first multiple parallax image generation unit 16, the compounding is performed by using the blend information α in order to prevent a blurred image which is hard to see from being generated in an edge portion of the region indicating the OSD image by the distortion.

Figure 5:
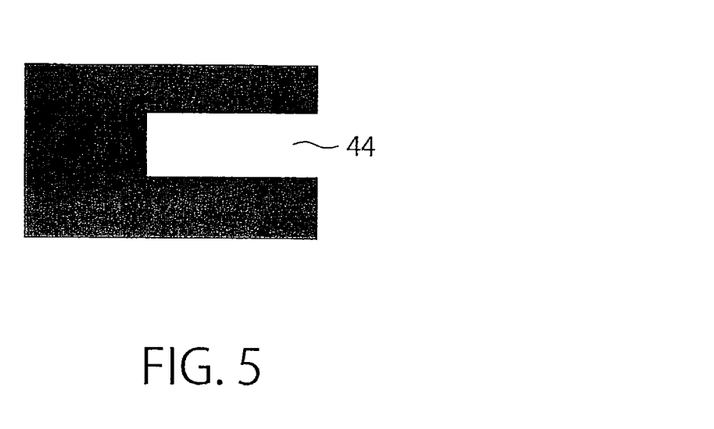
FIG. 5 is a diagram for explaining blend information of an OSD image.
Figure 6:
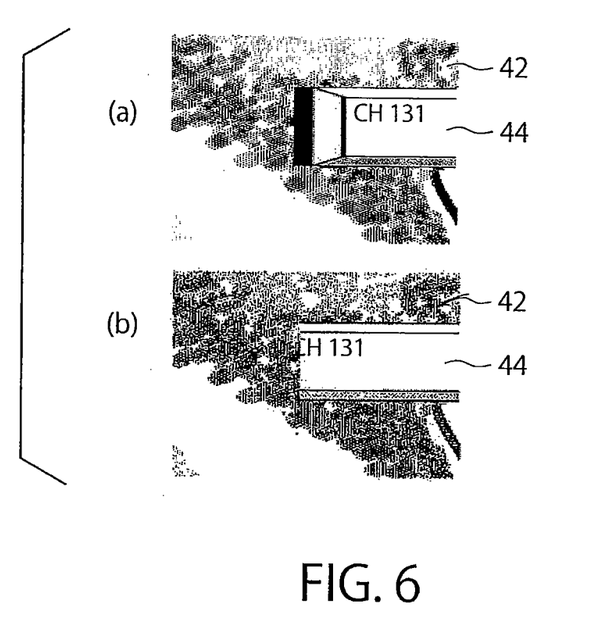
FIGS. 6(a) and 6(b) are diagrams showing a parallax image for a left eye and a parallax image for a right eye composed by using the blend information shown in FIG. 5, respectively.

This compounding is performed by the compounding circuit 19. If the parallax image of the region 44 indicating the OSD is simply blended with the background 42 by using the blend information α, then a value of the blend information α in a region which indicates the original OSD image drawn or set by the OSD drawing unit 4 shown in FIG. 5 differs from a value of the blend information αα in the OSD region of the parallax image shown in FIGS. 4(a) and 4(b). As a result, the background 42 is replaced even in a part having no OSD image 44 and a black part is generated as shown in FIG. 6(a). Or an end of the OSD image 44 itself is broken off as shown in FIG. 6(b).

Figure 7:
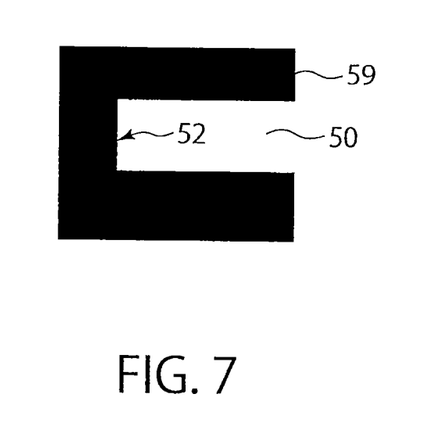
FIG. 7 is a diagram for explaining depth information of an OSD image used in an embodiment.

With regard to the depth information of the OSD image in the present embodiment, therefore, a range expanded to the left and right directions in the screen (in the horizontal direction of the screen) as shown in FIG. 7 as compared with the OSD image 44 shown in FIGS. 4(a) and 4(b) is taken as a region 50 located this side as compared with the background, i.e., having a greater value as the depth information. For example, the depth information having a range expanded to the left and right directions can be implemented by taking maximum values respectively of data obtained by shifting data (value) of the depth information to the left direction and data obtained by shifting data (value) of the depth information to the right direction. Furthermore, data (value) which indicates the depth information expanded to the left and right directions may be set previously in the OSD drawing unit 4. The data is set at the time of, for example, OSD data generation. As a result, a change point 52 of the value of the depth information is located in a part where the blend information α in the OSD image is 0, i.e., the image becomes transparent. Note that in FIG. 7, a region 59 is a region where the depth information in the screen is smaller than that of region 50. Therefore, taking a region expanded to the left and right directions in the screen as compared with the OSD image 44 as the region 50 means expanding the region 50 into the region where the blend information α of the OSD image becomes 0, and in addition means modifying or altering the blend information α of the OSD image on the basis of the depth information of the OSD.

Figure 8:
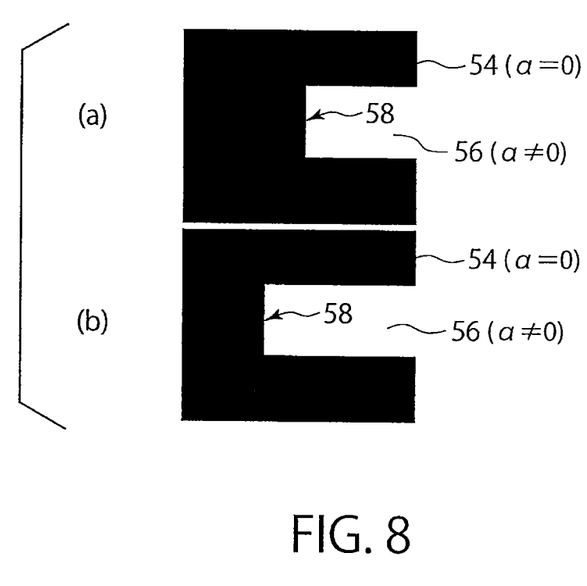
FIGS. 8(a) and 8(b) are diagrams for explaining blend information for a left eye and blend information for a right eye of an OSD image used in an embodiment, respectively.

Therefore, the second multiple parallax image generation unit 18 generates a multiple parallax image on the basis of the depth information of the OSD. In each parallax image at this time, however, the blend information α is modified or changed on the basis of the depth information of the OSD to comply with the region of the OSD image moved (shifted) to the left and right directions on the basis of the depth information. The blend information α modified or changed on the basis of the depth information of the OSD at the time, for example, when the second multiple parallax image generation unit 18 has generated a parallax image for a left eye and a parallax image for a right eye is shown in FIGS. 8(*a*) and 8(*b*), respectively. In FIGS. 8(*a*) and 8(*b*), reference numeral 56 denotes a region where the blend value α is not 0, and reference numeral 58 denotes a boundary between a region where the modified or changed blend information α becomes 0 and a region where the modified or changed blend information α is not 0.

In the present embodiment, a region to which image transformation at the time when generating a multiple parallax image is applied becomes a part where the image is transparent, i.e., a region where the blend information α becomes 0 in this way. The rectangular region which represents the OSD image 44 is not transformed.

The compounding circuit 19 compounds the multiple parallax image generated by the first multiple parallax image generation unit 16 and the multiple parallax image concerning the OSD generated by the second multiple parallax image generation unit 18 by using the blend information modified or changed in the second multiple parallax image generation unit 18 on the basis of the depth information. In this way, the compounding circuit 19 generates a multiple parallax image obtained by the compounding. The compounding is performed by applying the following Expression to pixels in the multiple parallax images.

$$C = A\left(\frac{M-\alpha}{M}\right) + B\frac{\alpha}{M}$$

where M is a maximum value of the blend information α modified or changed on the basis of the depth information of the OSD, A is a pixel value (luminance value) of a pixel in the multiple parallax image generated by the first multiple parallax image generation unit 16, B is a pixel value (luminance value) of a pixel in the multiple parallax image generated by the second multiple parallax image generation unit 18, and C is a pixel value of a pixel in the multiple parallax image obtained by the compounding in the compounding circuit 19. For example, if the blend information α is represented by n bits, it follows that $M=2^n-1$.

Figure 9:
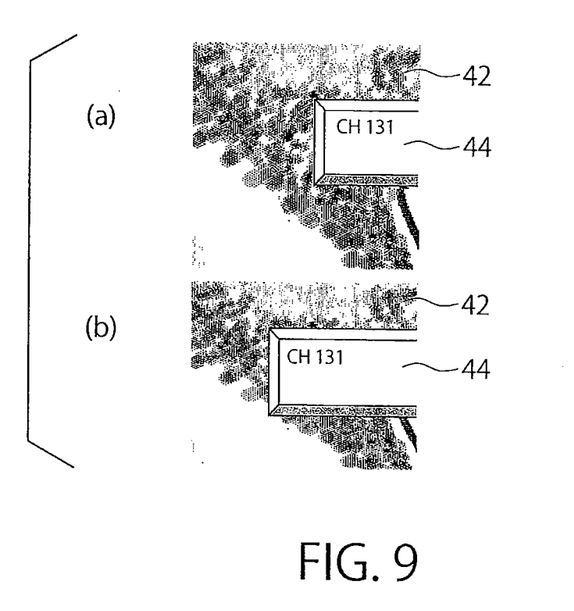
FIGS. 9(a) and 9(b) are diagrams showing a parallax image for a left eye and a parallax image for a right eye composed by using the blend information explained with reference to FIGS. 8(a) and 8(b), respectively.

The multiple parallax images obtained by such compounding are rearranged to form images for stereoscopic image display by the compounding circuit 19. The images for stereoscopic image display are sent to the display panel 20 and displayed. In the image for stereoscopic image display displayed on the display panel 20, the edge portion of the rectangular region 44 remains to keep its clean edge of the original image and the edge portion is not broken off. As a result, an image in which OSD blending is implemented without being tinted with an unnecessary color is obtained. For example, in the present embodiment, a parallax image compounded for the left eye is shown in FIG. 9(*a*) and a parallax image compounded for the right eye is shown in FIG. 9(*b*). As can be seen in FIGS. 9(*a*) and 9(*b*), a natural and clean stereoscopic image can be generated as to the OSD as well.

Figure 10:
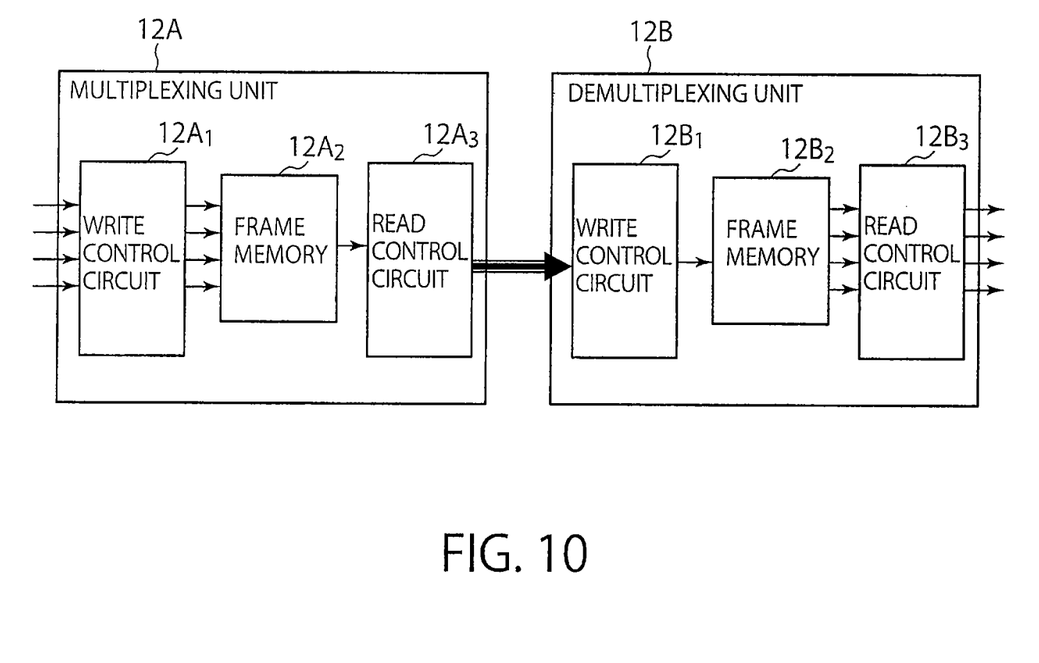
FIG. 10 is a diagram showing a configuration of a specific example of a circuit interface in an embodiment.

A transmission method of image data and OSD data in the present embodiment will now be described with reference to FIGS. 10 to 13. FIG. 10 is a diagram showing a configuration of a specific example of the circuit interface 12 in the present embodiment shown in FIG. 1. The circuit interface 12 in this concrete example includes a multiplexing unit 12A and a demultiplexing unit 12B. The multiplexing unit 12A includes a write control circuit $12A_1$, a frame memory $12A_2$, and a read control circuit $12A_3$. The multiplexing unit 12B includes a write control circuit $12B_1$, a frame memory $12B_2$, and a read control circuit $12B_3$.

The write control circuit $12A_1$ receives the image signal transmitted from the image signal processing unit 2 and the image signal of the OSD drawn or set in the OSD drawing unit 4, and writes the respective image signals into predetermined regions in the frame memory $12A_2$ frame by frame. Since the image signal transmitted from the image signal processing unit 2 includes signal values of R (red), G (green) and B (blue), a frame formed of signal values of R, G and B is written into a predetermined region in the frame memory $12A_2$. If the image signal transmitted from the image signal processing unit 2 includes depth information for each pixel, a frame concerning the depth information is written into a predetermined region in the frame memory $12A_2$.

Furthermore, the image signal of the OSD transmitted from the OSD drawing unit 4 includes the blend information α and the depth information besides the signal values of R, G and B. With regard to the image signal of the OSD, frames concerning the signal values of R, G and B, the blend information α, and the depth information are written into predetermined regions in the frame memory $12A_2$. As described later, the blend information α of the OSD can constitute one frame in conjunction with the R, G and B signal values of the OSD, or can constitute one frame in conjunction with the depth information.

The image signal written into the frame memory $12A_2$ is read out successively frame by frame by the read control circuit $12A_2$ and sent to the write control circuit $12B_1$ in the demultiplexing unit 12B. This write control circuit $12B_1$ writes an image signal of each frame which is input into a predetermined region in the frame memory $12B_2$. The image signal written into the frame memory $12B_2$ is read out successively frame by frame by the read control circuit $12B_2$ and sent to the first multiple parallax image generation unit 16 or the second multiple parallax image generation unit 18.

Figure 11:
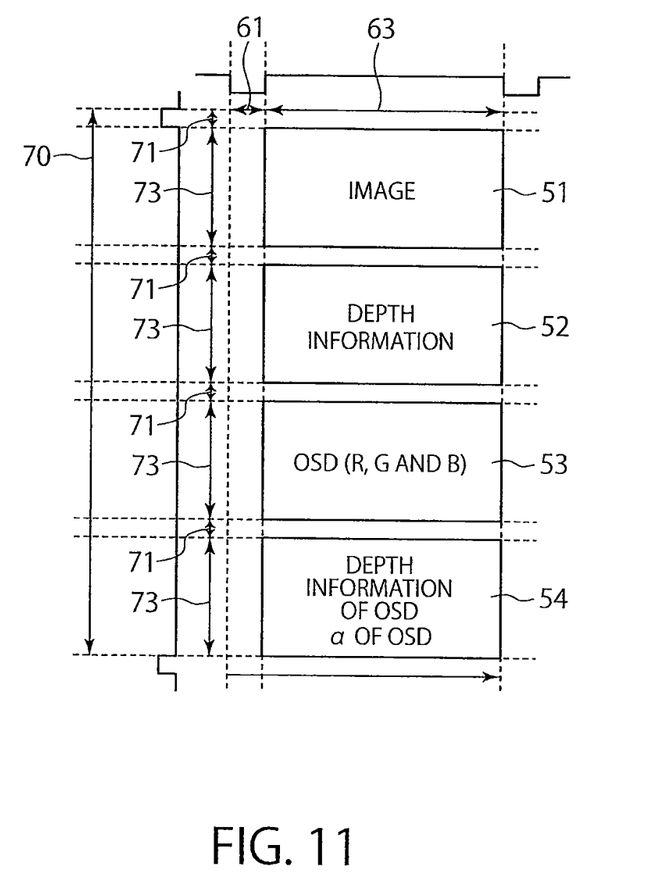
FIG. 11 is a diagram showing a first example of a transmission method of image data and OSD data.

If the High-Definition Multimedia Interface (HDMI) standards are used in the circuit interface 12, the circuit interface 12 can transmit three signal values of R, G and B. If the image signal transmitted from the image signal processing unit 2 is an image signal including the depth information, such as, for example, a three-dimensional image signal as shown in FIG. 11, then the image signals and information are divided into a frame 51 formed of signal values of R, G and B concerning the image signal, a frame 52 formed of depth information concerning the image signal, a frame 53 formed of signal values of R, G and B concerning the OSD image, and a frame 54 formed of the depth information and the blend information α of the OSD image. Processing for dividing the image signals and information into these frames is performed by the write control circuit 12A$_1$. The frames 51, 52, 53 and 54 are written into predetermined regions in the frame memory 12A$_2$. As a result, transmission can be performed without increasing the number of frames. In FIG. 11, reference numeral 61 denotes a horizontal blanking interval, 63 a horizontal scanning interval, reference numeral 70 denotes a one image scanning interval, reference numeral 71 denotes a vertical blanking interval, and reference numeral 73 denotes a vertical scanning interval.

Figure 12:
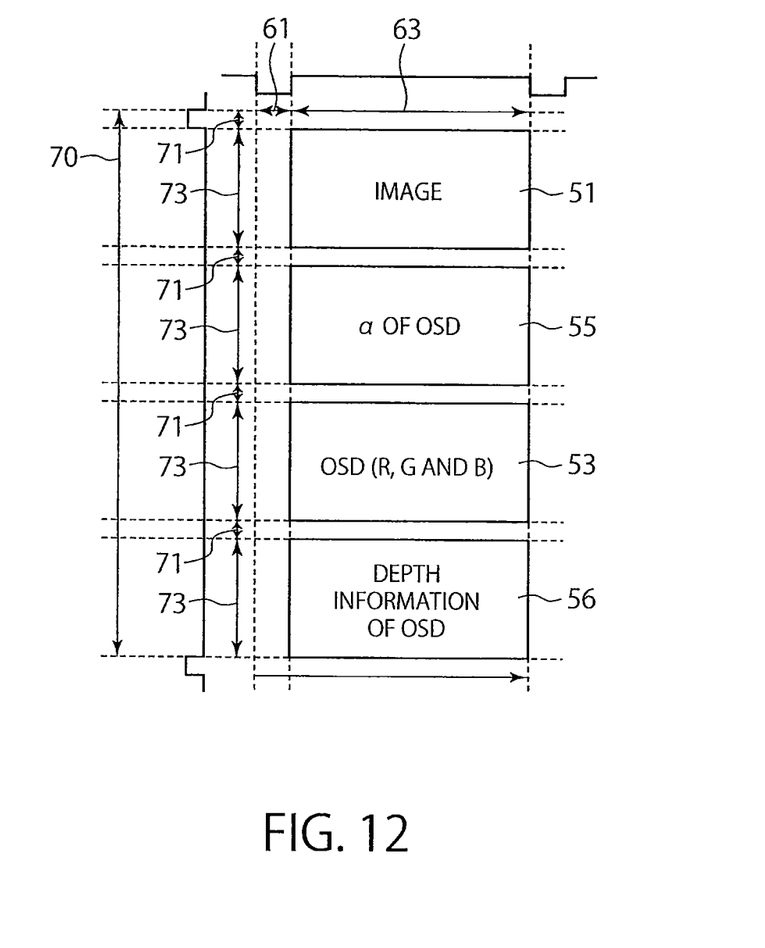
FIG. 12 is a diagram showing a second example of a transmission method of image data and OSD data.

If the image signal transmitted from the image signal processing unit 2 is an image signal which does not include depth information, such as, for example, a two-dimensional image signal, then the image signals and information may be divided into the frame 51 formed of signal values of R, G and B concerning the image signal, a frame 55 formed of the blend information α concerning the OSD image, the frame 53 formed of signal values of R, G and B concerning the OSD image, and a frame 56 formed of the depth information of the OSD image as shown in FIG. 12. In this case as well, transmission can be conducted without increasing the number of frames.

Figure 13:
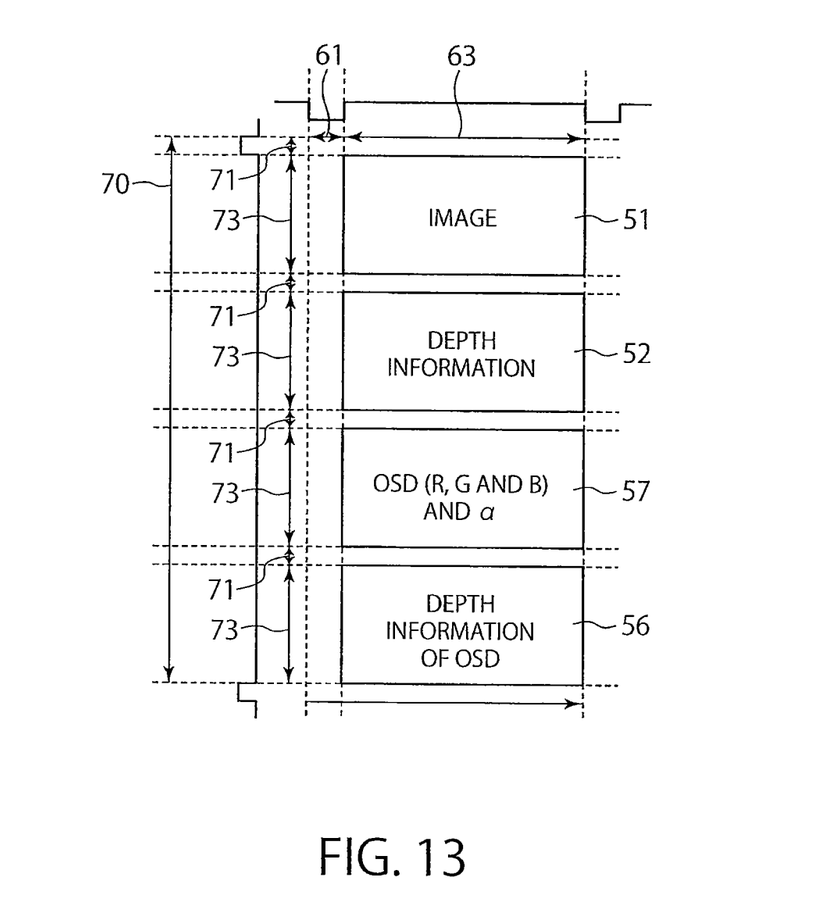
FIG. 13 is a diagram showing a third example of a transmission method of image data and OSD data.

On the other hand, if the LVDS (Low Voltage Differential Signaling) is used in the circuit interface 12, then 35-bit data can be transmitted and consequently the three signal values of R, G and B and the blend information α can be transmitted each in 8 bits, and in the total of 32 bits. In this case, the image signals and information are divided into the frame 51 formed of signal values of R, G and B concerning the image signal transmitted from the image signal processing unit 2, the frame 52 formed of depth information concerning the image signal, a frame 57 formed of signal values of R, G and B and the blend information α concerning the OSD image, and the frame 56 formed of the depth information of the OSD image as shown in FIG. 13. In this case as well, transmission can be conducted without increasing the number of frames and changing the form of the conventional transmission path.

According to the present embodiment, it becomes possible to display an OSD superposed on a multiple parallax image as described heretofore.

The parallax image conversion apparatus 10 according to the present embodiment can be used in a video recording/reproducing apparatus such as, for example, a DVD player.

Note that the parallax image conversion apparatus according to the present embodiment can include a display panel 20. Furthermore, the parallax image conversion apparatus according to the present embodiment can include at least one of the image signal processing unit 2 and the OSD drawing unit 4.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A parallax image conversion apparatus comprising:
a first multiple parallax image generator that generates a first multiple parallax image concerning a first image signal;
a second multiple parallax image generator that receives a second image signal, depth information, and blend information concerning an OSD image, changes the blend information based on the depth information, and generates a second multiple parallax image concerning the OSD image based on the second image signal and the depth information;
a compounding circuit that compounds the first multiple parallax image and the second multiple parallax image by using the changed blend information; and
a circuit interface that receives the first image signal, the second image signal, the depth information concerning the OSD image, and the blend information concerning the OSD image, sends the first image signal to the first multiple parallax image generator, and sends the second image signal, the depth information concerning the OSD image, and the blend information concerning the OSD image to the second multiple parallax image generator,
wherein, in the changed blend information used in the compounding, values of the blend information at a first screen region are moved in a horizontal screen direction to second and third screen regions, the values of the blend information becoming 0 at the first screen region before the move, and the values of the changed blend information becoming 0 at the second and third screen regions after the move, and
wherein if the first image signal includes depth information, then the circuit interface performs processing by dividing the image signals and information into a first frame concerning R, G and B signal values of the first image signal, a second frame concerning depth information of the first image signal, a third frame concerning R, G and B signal values of the OSD image, and a fourth frame concerning the depth information and the blend information of the OSD image.

2. A parallax image conversion apparatus comprising:
a first multiple parallax image generator that generates a first multiple parallax image concerning a first image signal;
a second multiple parallax image generator that receives a second image signal, depth information, and blend information concerning an OSD image, changes the blend information based on the depth information, and generates a second multiple parallax image concerning the OSD image based on the second image signal and the depth information;
a compounding circuit that compounds the first multiple parallax image and the second multiple parallax image by using the changed blend information; and
a circuit interface that receives the first image signal, the second image signal, the depth information concerning the OSD image, and the blend information concerning the OSD image, sends the first image signal to the first multiple parallax image generator, and sends the second image signal, the depth information concerning the OSD image, and the blend information concerning the OSD image to the second multiple parallax image generator,
wherein, in the changed blend information used in the compounding, values of the blend information at a first screen region are moved in a horizontal screen direction to second and third screen regions, the values of the blend information becoming 0 at the first screen region before the move, and the values of the changed blend information becoming 0 at the second and third screen regions after the move, and wherein if the first image signal includes depth information, then the circuit interface performs processing by dividing the image signals and information into a first frame concerning R, G and B signal values of the first image signal, a second frame concerning depth information of the first image signal, a third frame concerning R, G and B signal values and the blend information of the OSD image, and a fourth frame concerning the depth information of the OSD image.

3. A parallax image conversion apparatus comprising:

a first multiple parallax image generator that generates a first multiple parallax image concerning a first image signal;

a second multiple parallax image generator that receives a second image signal, depth information, and blend information concerning an OSD image, changes the blend information based on the depth information, and generates a second multiple parallax image concerning the OSD image based on the second image signal and the depth information;

a compounding circuit that compounds the first multiple parallax image and the second multiple parallax image by using the changed blend information; and a circuit interface that receives the first image signal, the second image signal, the depth information concerning the OSD image, and the blend information concerning the OSD image, sends the first image signal to the first multiple parallax image generator, and sends the second image signal, the depth information concerning the OSD image, and the blend information concerning the OSD image to the second multiple parallax image generator, wherein, in the changed blend information used in the compounding, values of the blend information at a first screen region are moved in a horizontal screen direction to second and third screen regions, the values of the blend information becoming 0 at the first screen region before the move, and the values of the changed blend information becoming 0 at the second and third screen regions after the move, and wherein if the first image signal does not include depth information, then the circuit interface performs processing by dividing the image signals and information into a first frame concerning R, G and B signal values of the first image signal, a second frame concerning the blend information of the OSD image, a third frame concerning R, G and B signal values of the OSD image, and a fourth frame concerning the depth information of the OSD image.

4. The parallax image conversion apparatus according to claim 1, further comprising a display panel that displays an image obtained by compounding in the compounding circuit.

5. The parallax image conversion apparatus according to claim 1, further comprising a depth information generator that generates depth information concerning the first image signal from the first image signal, wherein if the first image signal does not include depth information, the first multiple parallax image generator generates the first multiple parallax image by using the depth information generated by the depth information generator.

6. The parallax image conversion apparatus according to claim 1, wherein if the first image signal includes depth information, the first multiple parallax image generator generates the first multiple parallax image by using the depth information included in the first image signal.

7. The parallax image conversion apparatus according to claim 2, further comprising a depth information generator that generates depth information concerning the first image signal from the first image signal, wherein if the first image signal does not include depth information, the first multiple parallax image generator generates the first multiple parallax image by using the depth information generated by the depth information generator.

8. The parallax image conversion apparatus according to claim 2, wherein if the first image signal includes depth information, the first multiple parallax image generator generates the first multiple parallax image by using the depth information included in the first image signal.

9. The parallax image conversion apparatus according to claim 2, further comprising a display panel that displays an image obtained by compounding in the compounding circuit.

10. The parallax image conversion apparatus according to claim 3, further comprising a depth information generator that generates depth information concerning the first image signal from the first image signal, wherein if the first image signal does not include depth information, the first multiple parallax image generator generates the first multiple parallax image by using the depth information generated by the depth information generator.

11. The parallax image conversion apparatus according to claim 3, wherein if the first image signal includes depth information, the first multiple parallax image generator generates the first multiple parallax image by using the depth information included in the first image signal.

12. The parallax image conversion apparatus according to claim 3, further comprising a display panel that displays an image obtained by compounding in the compounding circuit.

* * * * *